United States Patent

[11] 3,590,466

| [72] | Inventors | Hermann Moshammer;<br>Jaroslav Koser, both of Braunau-Ranshofen, Austria |
|---|---|---|
| [21] | Appl. No. | 817,883 |
| [22] | Filed | Apr. 21, 1969 |
| [45] | Patented | July 6, 1971 |
| [73] | Assignee | Vereinigte Metallwerke Ranshofen-Berndorf Aktiengesellschaft<br>Postfach, Wien, Austria |
| [32] | Priority | Apr. 22, 1968 |
| [33] | | Austria |
| [31] | | A 3866/68 |

[54] METHOD OF MAKING FLAT REINFORCED STRUCTURES
10 Claims, 15 Drawing Figs.

[52] U.S. Cl. .................................................. 29/471.3,
29/423, 29/472.1, 29/493, 269/312
[51] Int. Cl. .................................................. B23k 31/02
[50] Field of Search .................................... 29/472.3,
472.1, 471.3, 471.1, 423, 493; 269/7, 312, 296

[56] References Cited
UNITED STATES PATENTS

| 3,427,706 | 2/1969 | Jaffee ........................... | 29/423 X |
| 3,453,717 | 7/1969 | Pfaffenberger et al. ...... | 29/423 |
| 3,460,232 | 8/1969 | Pfaffenberger et al. ...... | 29/423 |
| 3,460,233 | 8/1969 | Pfaffenberger et al. ...... | 29/423 |

Primary Examiner—John F. Campbell
Assistant Examiner—R. B. Lazarus
Attorney—Karl F. Ross ABSTRACT: A flat panel-shaped structure with a single face plate reinforced by parallel webs on one side, or with a pair of parallel face plates interconnected by such webs, is formed by removably inserting one or more web-forming profiles in slots of a pressure-resistant supporting plate, these profiles having flange portions coming to rest against opposite surfaces of that plate; two sheets are then placed on the plate surfaces in contact with these flange portions, and the resulting stack is repeatedly passed at elevated temperatures between one or more roller pairs whereby the sheets are laminated under heat and pressure onto the profile or profiles to form two symmetrical panels or a single panel upon removal of the composite from the supporting plate.

PATENTED JUL 6 1971

HERMANN MOSHAMMER
JAROSLAV KOSER
*INVENTORS.*

BY *Karl F. Ross*

ATTORNEY

HERMANN MOSHAMMER
JAROSLAV KOSER
INVENTORS.

BY Karl G. Ross
ATTORNEY

HERMANN MOSHAMMER
JAROSLAV KOSER
INVENTORS.

BY Karl F. Ross

ATTORNEY

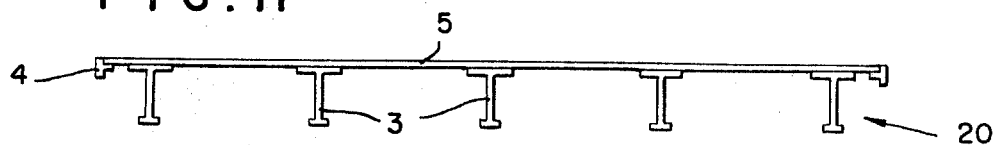
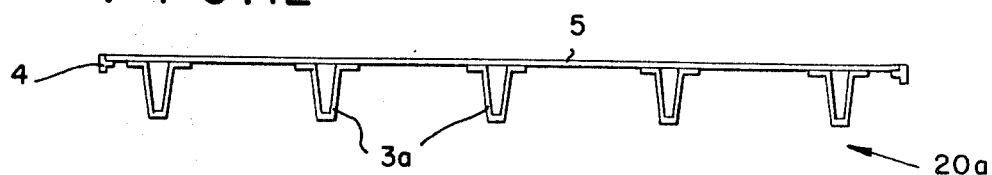
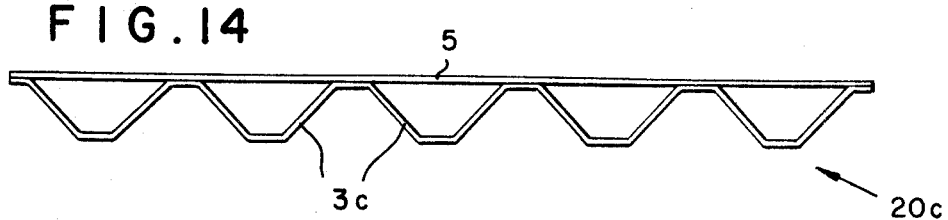
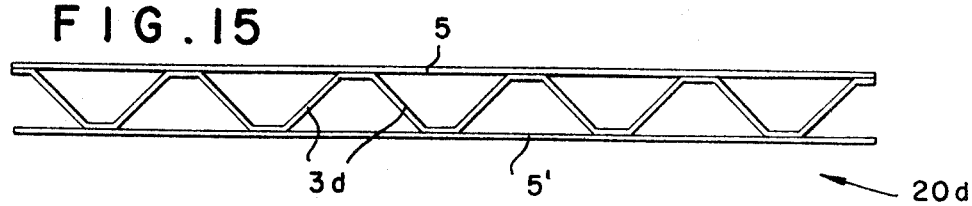
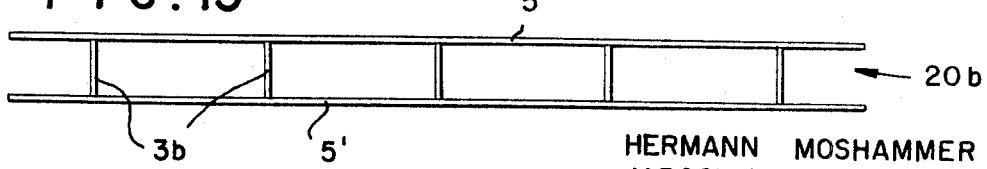

METHOD OF MAKING FLAT REINFORCED STRUCTURES

Our present invention relates to a method of manufacturing flat panel-shaped structures with either a single face plate reinforced by parallel webs or a pair of parallel face plates interconnected by such webs.

Structures of this type, especially when made of light metal or plastic material, can be used as lightweight wall sections for partitions, ceilings and the like. A typical but nonlimitative field of use is in the construction of portable swimming pools.

Conventional methods of manufacturing such structures include the joining of reinforcing ribs or profiles to sheet-metal plates by brazing or welding. This mode of manufacture is time-consuming and expensive. The alternative of extrusion of the entire profile is impractical in the case of large-area panel sections.

It is, therefore, the general object of our present invention to provide a method of mass-producing such structures in a convenient and relatively inexpensive manner.

This object is realized, pursuant to the present invention, by providing a deformation-resistant supporting plate with a set of parallel slots on at least one major surface, preferably on both surfaces, and removably depositing therein mating web formations which may form part of several profiles or a single profile to be bonded onto a sheet or a pair of sheets placed on the corresponding plate surface so as to be in contact with flange portions which are integral with these web portions and which come to rest against that surface. The resulting stack, with the supporting plate preferably sandwiched between two sheets, is then passed at elevated temperatures between one or more pairs of coacting pressure rollers for a sufficient number of times to laminate the sheet or sheets onto the contacting flange portions of the profile or profiles to be secured thereto. The composite structure or structures produced by this laminating operation are then removed from the supporting plate which thus becomes available for reuse in the manufacture of similar structures.

Although, in principle, the method can be practiced with nonmetallic materials such as synthetic resins, we have found it particularly advantageous when used with light metals such as aluminum and its alloys. These metals, which should possess a certain degree of malleability and ductility, deform under pressure at temperatures between about 200° and 500° C., an optimum working range in the case of aluminum alloys being between 450° and 500° C. The materials of the sheets and the profiles, though necessarily compatible, need not be of the same composition but may consist of different alloys so as to cause relative flow along their interface; usually, it will be advantageous to make the profiles more highly deformable than the sheets to ensure retention of shape along the outer surface or surfaces. The supporting plate should, of course, be highly resistant to heat and pressure and may be coated, along its surfaces of contact with the profiles and the sheets, with a heat-resistant antifriction and bond-breaking agent (e.g. graphite or molybdenum disulfide) designed to prevent adherence of the laminate to the plate and to facilitate relative motion therebetween during the rolling process.

The above and other features of our invention will be described in greater detail hereinafter with reference to the accompanying drawing in which.

Figure 1:
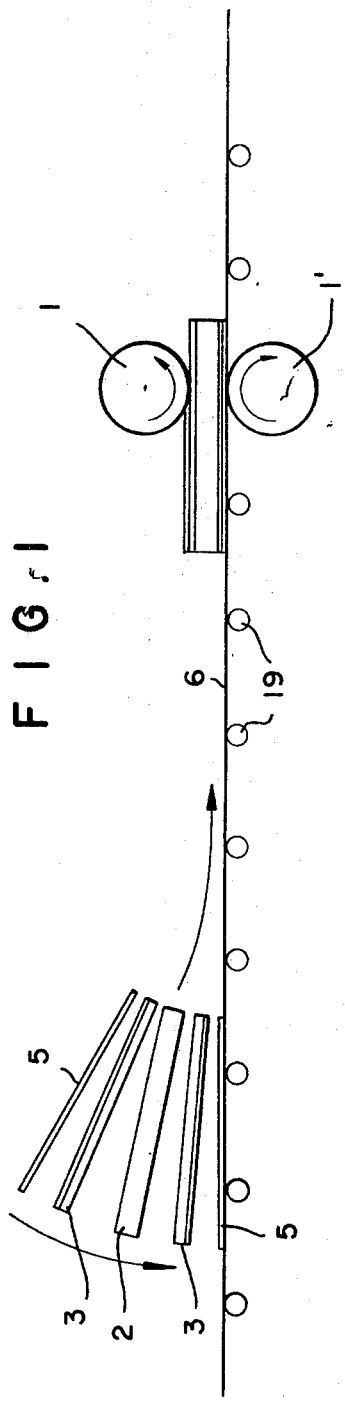
FIG. 1 is a diagrammatic side-elevational view of a system for carrying out the method according to our invention.
Figure 2:
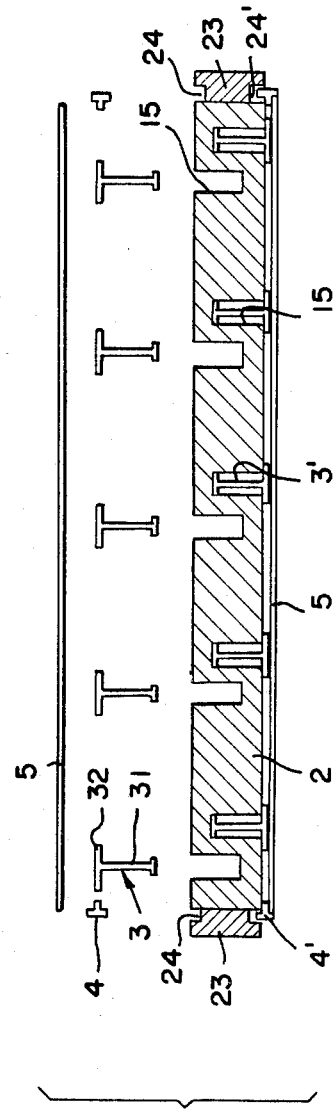
FIGS. 2 and 3 are cross-sectional views, drawn to a larger scale, of the components of different stacks to be rolled by the system of FIG. 1.
Figure 3:
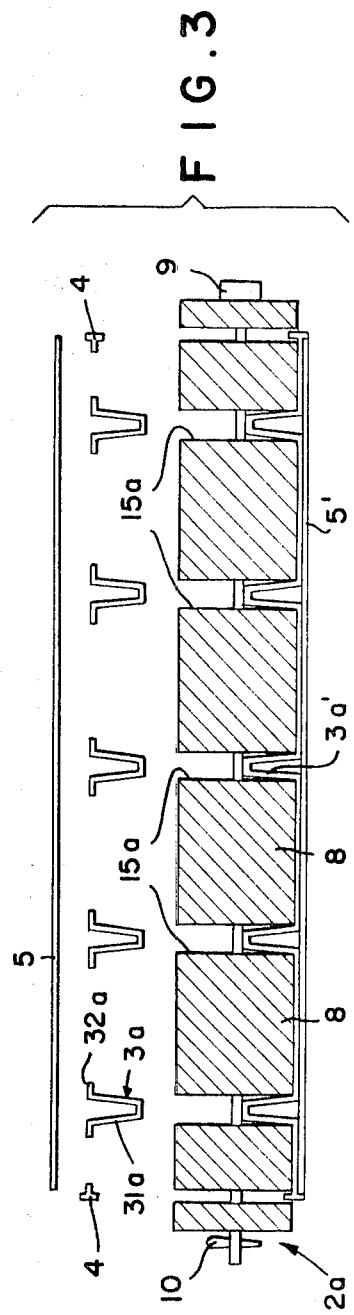
Figure 4:
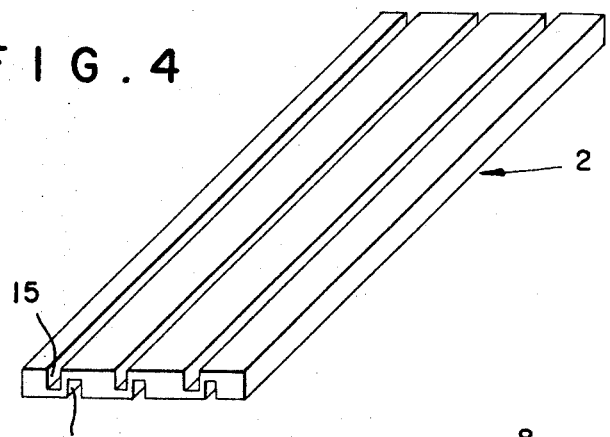
Figure 5:
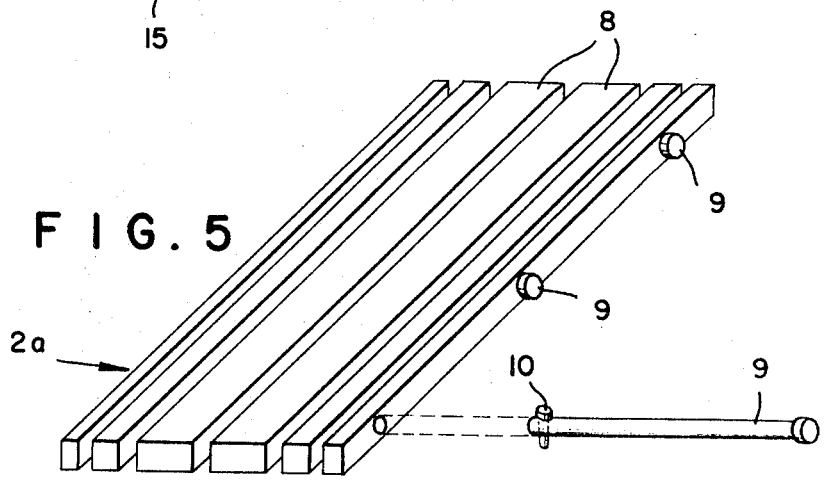
Figure 6:
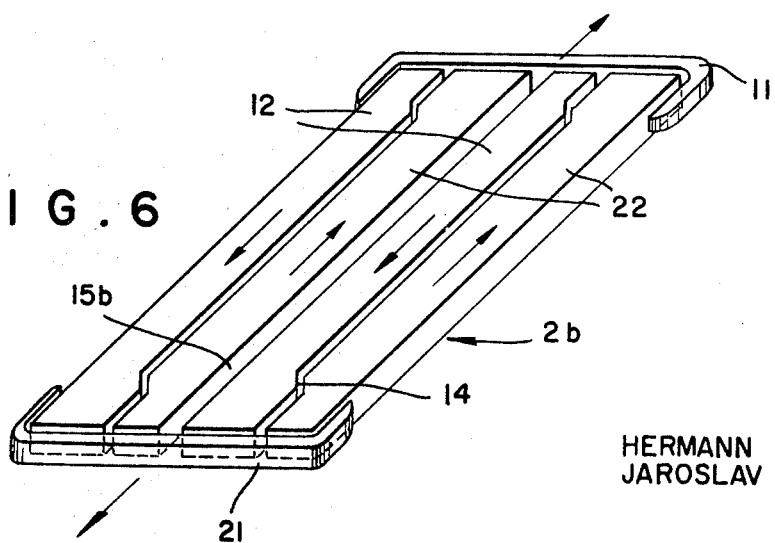
Figure 7:
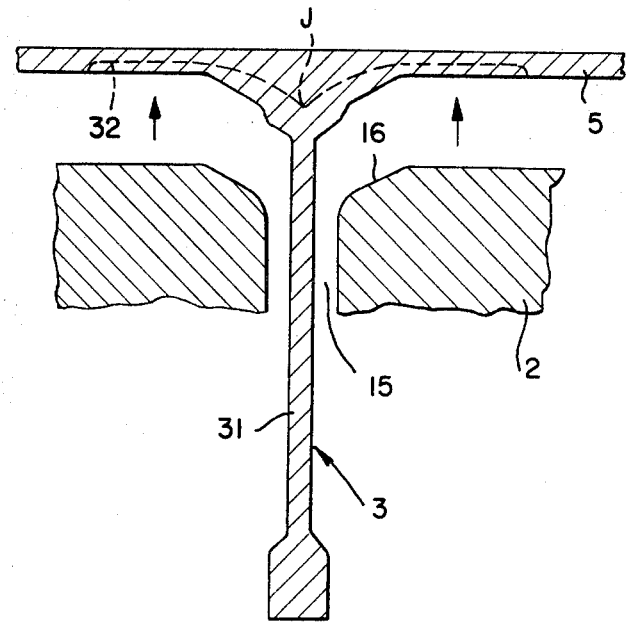
Figure 9:
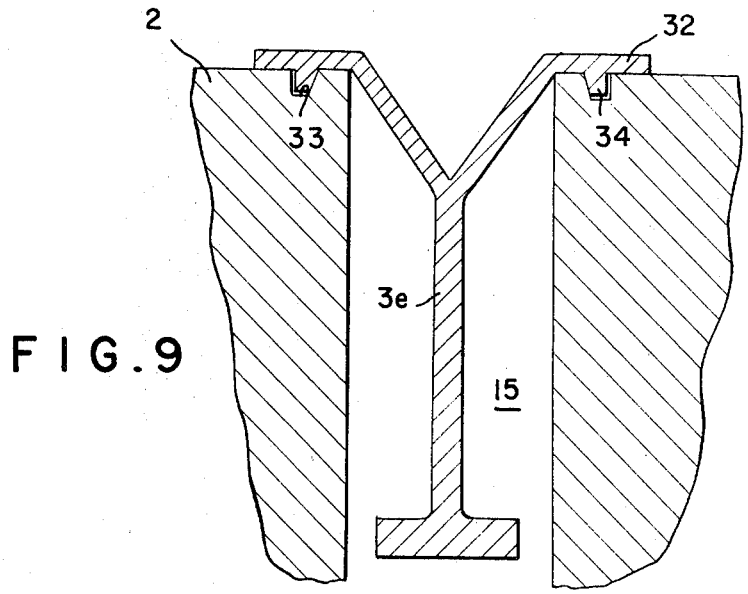
Figure 10:
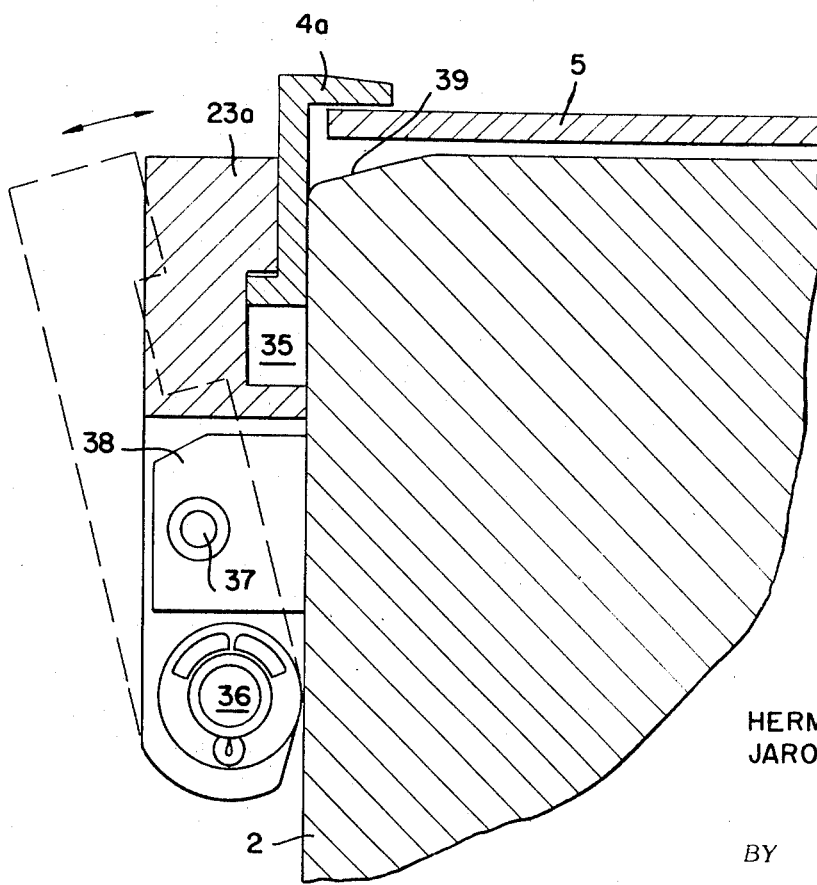

FIGS. 4—6 are perspective views of different supporting plates to be used in a stack of the type illustrated in FIGS. 1—3;

FIGS. 7 and 9 are enlarged sectional detail views illustrating certain modifications; and FIG. 10 is a cross-sectional detail view showing a partial modification of the plate of FIG. 2; and FIGS. 11—15 are side views of different panel structures produced by the method according to our invention.

In FIG. 1 we have shown a stack including a centrally disposed supporting plate 2, e.g. of refractory steel, sandwiched between a pair of flat metal sheets 5 and 5', with interposition of respective T-profiles 3 and 3' as more clearly illustrated in subsequent Figures. Thus, FIG. 2 shows the plate 2 as formed with a multiplicity of parallel slots 15 along its upper surface and with similar slots 15' along its lower surface (see also FIG. 4), each slot 15 or 15' receiving a respective profile 3 or 3' so that the flange portions 32 of the profile overlie the respective plate surface while its web portion 31 enters the corresponding slot. FIG. 2 also shows the plate 2 flanked by a pair of side strips 23 which form top and bottom grooves 24, 24' to accommodate ancillary T-profiles 4, 4' which lie at right angles to the main T-profiles 3, 3' and whose webs, therefore, are compressed between the plate 2 and the sheet 5, 5' when the stack is fed to the nip of a pair of pressure rollers 1, 1', FIG. 1, by a conveyor belt 6 carried on supporting rollers 19. These rolling operations take place at suitable elevated temperatures such as the aforementioned range of 450°—500° C. In practice a preliminary pass at reduced pressure may be followed by several passes at increased pressure to laminate the flanges 32 of profiles 3 and 3' onto the inner surfaces of the sheets 5 and 5', respectively, thereby producing two substantial symmetrical structures of the type shown at 20 in FIG. 11. It will be noted that the ancillary profiles 4 form a pair of edge flanges which can be used for welding or otherwise bonding the panel section 20 to an adjoining section of similar configuration.

The sandwiching of the common supporting plate 2 between two laminates 3, 5 and 3', 5' not only doubles the production rate but also protects the pressure rollers 1, 1' from direct contact with the refractory material of plate 2.

The sheets 5 and 5' may consist, for example, of aluminum, aluminum-magnesium alloy or copper, with the profiles advantageously made from copper-aluminum alloy. The profiles should be sufficiently deformable to prevent outward bulging of the sheets at their junction with the profiles, due to a flattening of the intervening sheet portions, yet should not be so highly yieldable as to enable a sagging of the sheets at the locations of the slots. Thus, the relative hardness of the material (and therefore the choices of alloys) depends, inter alia, upon the thickness and deformability of the sheets. This thickness must also not be so low as to lead to longitudinal corrugation of the sheets during rolling, a tendency which is lessened by the coating of the surfaces of plate 2 with an antifriction agent as described above.

Although, for simplicity, the sheets 5, 5' are assumed to be flat, they could also be stepped or curved in a direction transverse to the conveyor 6, i.e. parallel to the slots 15 and 15', with corresponding shaping of the supporting plate 2 and the rollers 1, 1'. The supporting plate 2 may be preheated before rolling to a temperature of, say, 300°—400° C. to prevent a overly rapid cooling of the laminated parts.

In FIGS. 3 and 5 we have shown a modified arrangement in which the T-profiles 3 of the preceding embodiment have been repressed by generally U-shaped profiles 3a, 3a' with webs 31a and flanges 32a, these profiles fitting in throughgoing slots 15a formed between bars 8 of a supporting plate 2a. The bars are held together by several headed bolts 9 provided with retaining pins 10 which are removed after rolling to facilitate disassembly of the stack. The resulting structure 20a, symmetrically duplicated on opposite sides of plate 2a, has been illustrated in FIG. 12.

FIG. 6 shows a further modified supporting plate 2b which, lacking the throughgoing bolts 9 of plate 2a, can be used for the manufacture of a laminate with two face plates formed by the sheets 5 and 5' of FIGS. 1—3. The plate 2b is composed of two pairs of alternately interleaved bars 12, 22 carried by respective end brackets 11 and 21 while forming slots 15b therebetween; certain of these slots have bends 14 which limit the length of the inserted profiles. When the rolling operation is completed, the brackets 11, 21 are separated in the direction of the arrows whereby the bars 12 and 22 are extracted from between the profiles. A plate of this general construction may be used to make a composite structure 20b, FIG. 13, whose sheets 5, 5' are interconnected by stays 3b.

In FIGS. 11 and 12 the flange portions of the profiles 3 and 3a are clearly visible, thus indicating only a slight deformation of the parts under the rolling pressure. Where a more intimate bonding is desired, sufficient pressure may be applied to make the flange portions of the profiles blend into the adjoining web surfaces substantially without discontinuity. This technique, however, involves considerable deformation of both the sheet and the profile which, in the absence of special measures, may cause the profile to become so tightly wedged in its slot as to prevent its subsequent removal from its supporting plate. As shown in FIG. 7, therefore, we may round off and/or bevel the edges of the plate 2 at 16 to form widened gaps at the terminations of slots 15 so as to provide a clearance on each side of the web 31. Upon subsequent rolling, the profile 3 is deformed into these clearances while the displaced material of the profile and the sheet 5 accumulates near the center of the junction J. In the region of this junction point, in which the effective pressure is at a minimum, substantially no bonding takes place; effective lamination, however, occurs along the outer flange portions 32 which, as shown, merge with the sheet 7.

Figure 8:
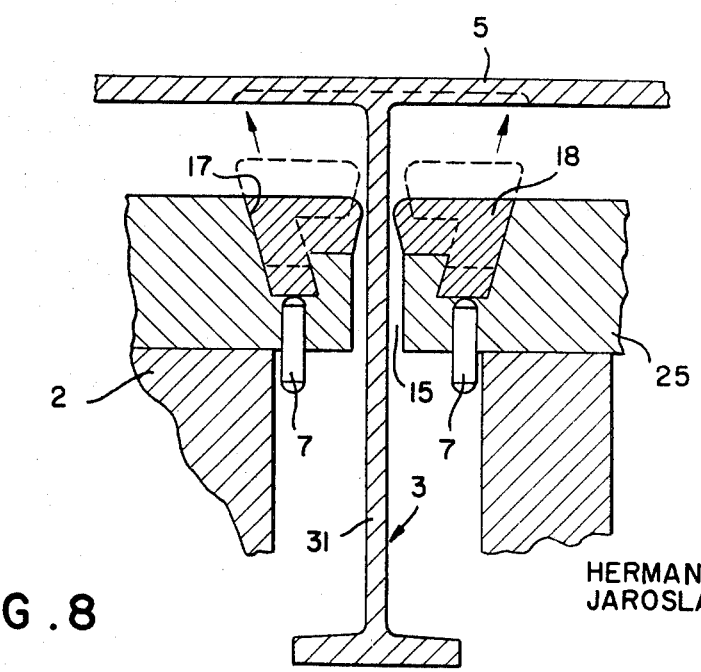

FIG. 8 shows an alternate possibility in which the slots 15 terminate in outwardly widening gaps 17 again forming clearances on opposite sides of web 31. In this case, however, the clearances are occupied by transversely extending laterally beveled spacers 18 which limit the deformation of the web 31 and which can subsequently be dislodged, e.g. with the aid of ejector pins 7, to release the profile 3 wedged therebetween. The gaps 17 may be formed in cover strips 25 overlying the plate 2 proper to which they may be removably secured by screws or the like.

Thus, the double-sheet panel section 20b of FIG. 13 may be formed from I-beam profiles whose flanges are blended in the aforedescribed manner into the sheets 5, 5' and whose webs constitute the stays 3b.

In FIG. 14 we have shown a structure 20c which differs from structures 20 and 20a by the fact that the several web portions thereof are part of a unitary undulating profile 3c of trapezoidal configuration. As illustrated in FIG. 15, a similar profile 3d can be used to interconnect two sheets 5, 5' so as to form a two-faced structure 20d, e.g. with the aid of a supporting plate of the type illustrated in FIG. 6 whose bars 12, 22 are given complementary trapezoidal cross sections.

All the profiles described above, if designed for use with flat sheets, can be produced by a simple extrusion process. The bent profiles 3a as well as the corrugated members 3c, 3d could also be rationally manufactured by deep drawing from sheet material.

The diverging gap shown at 16 in FIG. 7, designed to facilitate the extraction of the laminate from the slot 15, affords less precise guidance for the profile 3 than does the indexing arrangement of FIG. 8. For more positive guidance we may provide the supporting plate 2 with a pair of grooves 33 flanking each slot 15, as illustrated in FIG. 9, these grooves serving to receive respective ribs 34 projecting from the flanges of a respective profile 3e.

The two ancillary T-profiles 4, 4' shown in FIGS. 1, 2 and 11 also have a guiding function, keeping the sheet 5 or 5' centered with reference to the supporting plate 2. With high rolling pressures, however, these marginal profiles may prevent a transverse expansion of the sheet so that the latter tends to bulge away from the adjoining plate surface. In order to counteract this tendency, we may replace these T-profiles by generally Z-shaped profiles 4a, as shown in FIG. 10, whose shorter, outwardly directed flanges are held in recesses 35 of side strips 23a which are pivotable about axes 36 paralleling the lateral edges of plate 2. A locking bolt 37, traversing a lug 38 rigid with plate 2, serves to hold each strip 23a in its operating position illustrated in full lines; upon withdrawal of this bolt, the strip may be swung out (as shown in dot-dash lines) to release the sheet 5 with its marginal profile 4a laminated thereto. Plate 2 is shown beveled at 39, FIG. 10, to provide additional space into which the sheet 5 can expand under high pressure.

Manganese and titanium are among other light metals that may be used, e.g. in combination with aluminum, for the sheets to be laminated in accordance with our invention. An aluminum-magnesium-manganese alloy is particularly suitable for use in wet environments such as swimming pools.

We claim:

1. A method of making a panel-shaped structure, comprising the steps of providing a deformation-resistant supporting plate with a set of parallel slots on at least one major surface, inserting at least one deformable profile with mating web formations into said slots, said web formations being integral with flange portions coming to rest upon said surface, forming a stack by placing a deformable sheet on said surface in contact with said flange portions, laminating said sheet onto said flanges by passing said stack at elevated temperatures between coacting pressure rollers, and removing the resulting laminate from said supporting plate.

2. A method as defined in claim 1 wherein said supporting plate is provided with another set of slots on the opposite major surface, said stack including a second deformable sheet positioned on said opposite surface in contact with other flange portions integral with web formations matingly received in said other set of slots.

3. A method as defined in claim 2 wherein the slots on opposite surfaces are interconnected, said supporting plate being formed from bars separated by said slots which are laterally withdrawn from between said web formations upon completion of said laminate.

4. A method as defined in claim 1 wherein said sheet and said profile consist of malleable metals.

5. A method as defined in claim 4 wherein the metals of said sheet and said profile have different softening points at least along their contact surfaces.

6. A method as defined in claim 4 wherein at least one of said malleable metals is an aluminum alloy.

7. A method as defined in claim 6 wherein said elevated temperatures range between substantially 450° C. and 500° C.

8. A method as defined in claim 1 wherein said slots terminate in widened gaps forming clearances on both sides of said web formations.

9. A method as defined in claim 8 wherein tapering spacer bars are inserted into said clearances before rolling and are removed after rolling to facilitate extraction of said profile from said supporting plate.

10. A method as defined in claim 1 wherein a nonbonding antifriction layer is interposed between said major surface on the one hand and said flange portions and said sheet on the other hand.